Patented Jan. 29, 1946

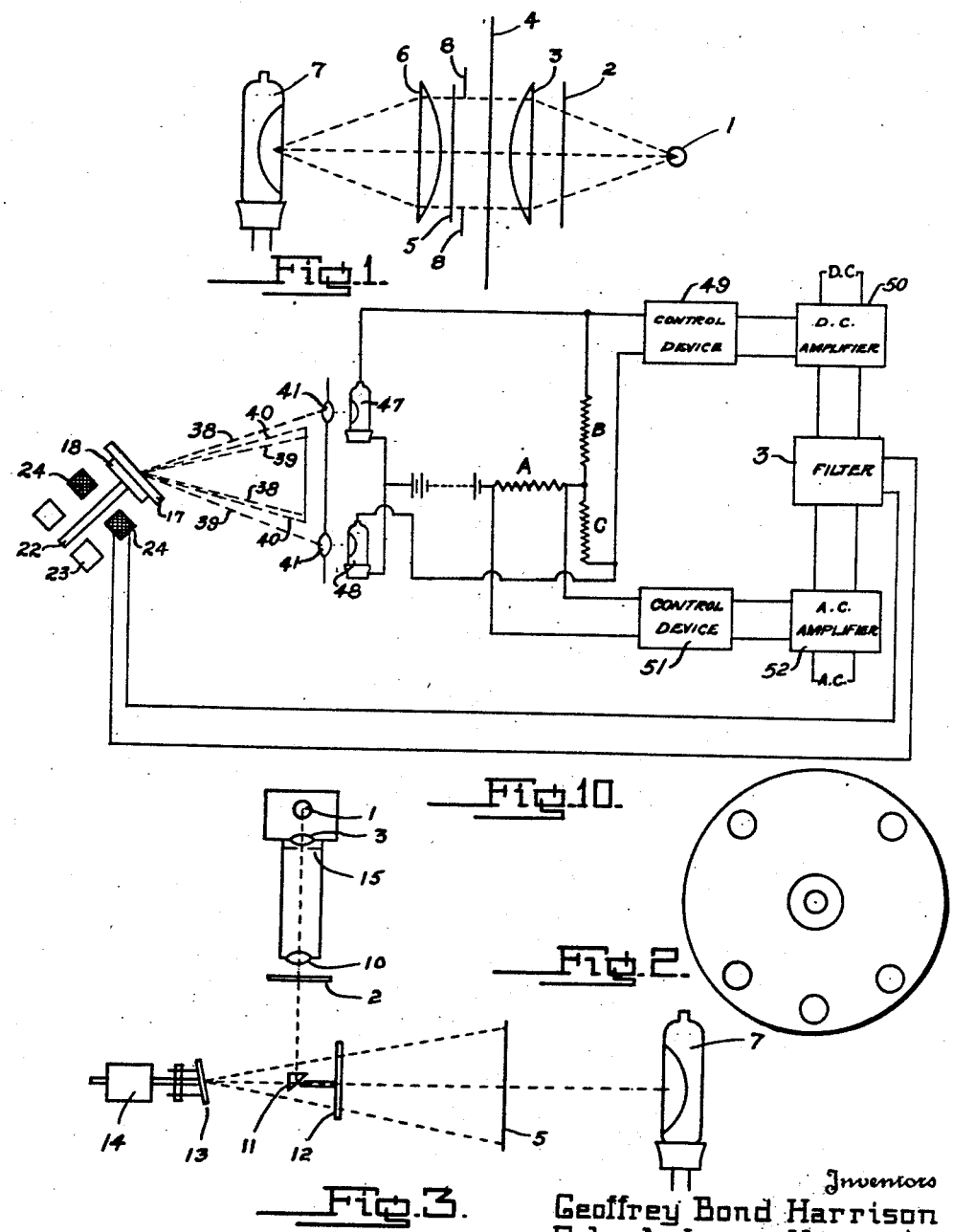
Jan. 29, 1946.   G. B. HARRISON ET AL   2,393,631
TESTING OF PHOTOGRAPHIC FILMS, PLATES, AND PAPERS
Filed Nov. 18, 1941   3 Sheets-Sheet 1
Inventors
Geoffrey Bond Harrison
Robert James Hercock
Reginald Geoffrey Horner
By Lynn B. Morris
Attorney

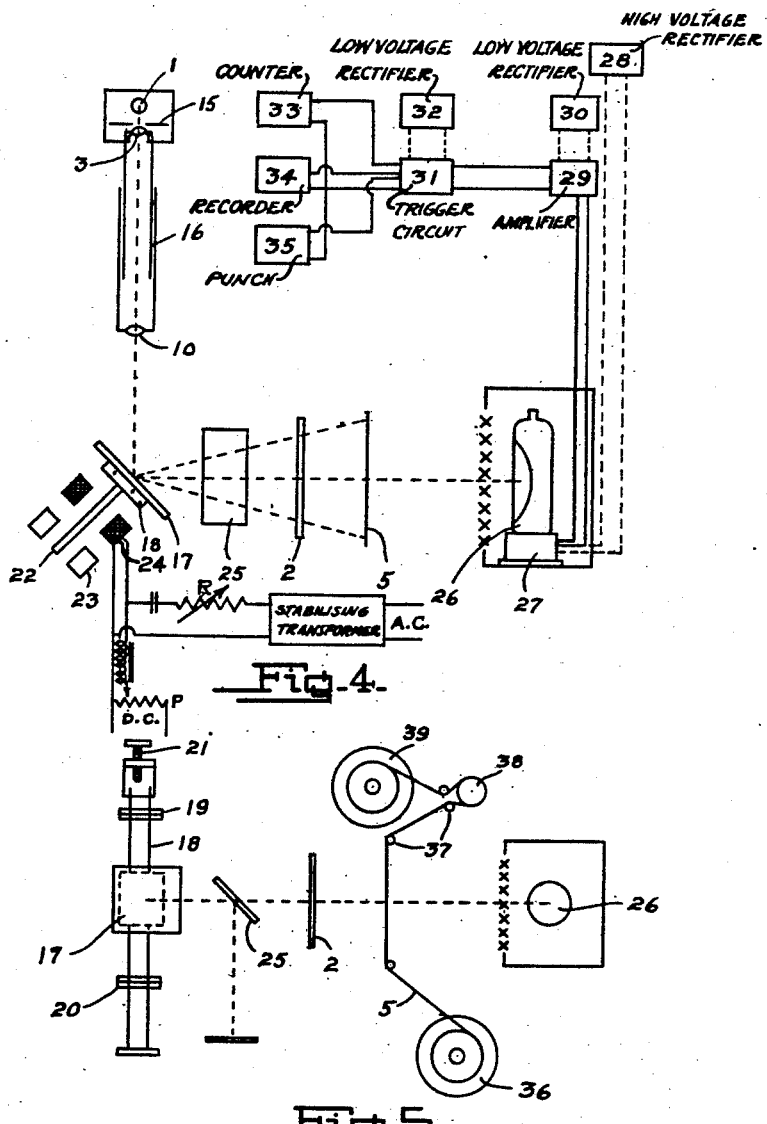

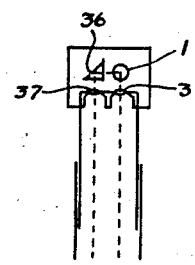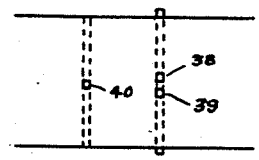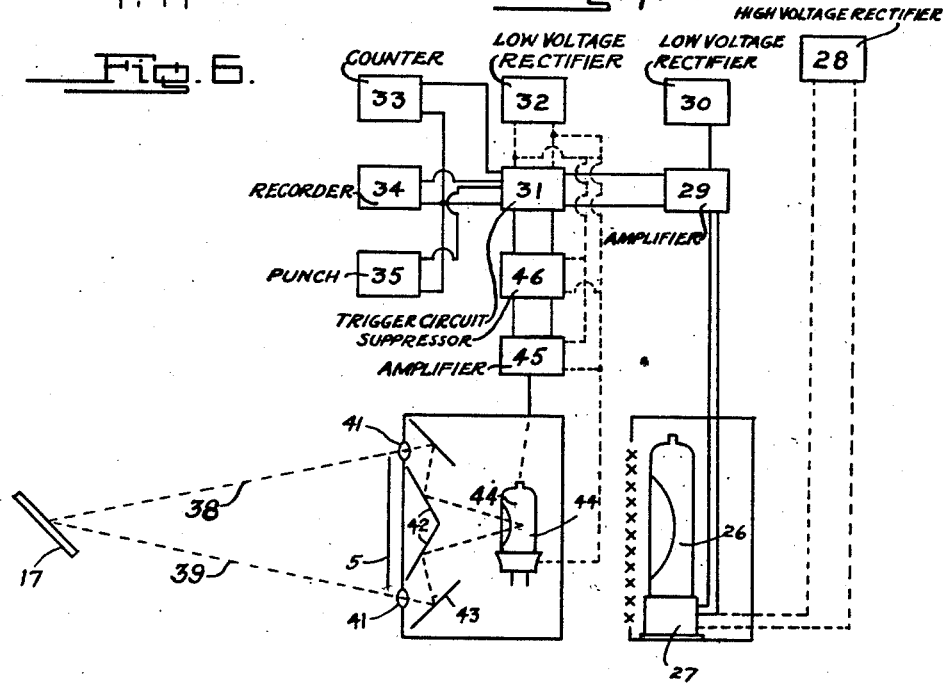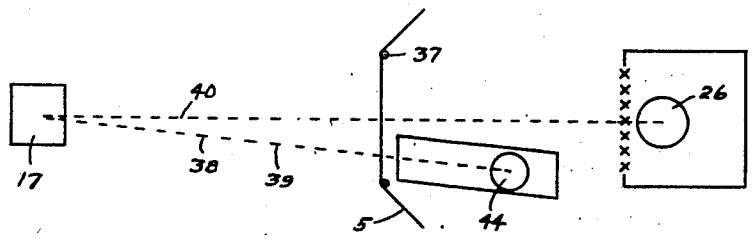

2,393,631

UNITED STATES PATENT OFFICE 2,393,631

TESTING OF PHOTOGRAPHIC FILMS, PLATES, AND PAPERS

Geoffrey Bond Harrison, Robert James Hercock, and Reginald Geoffrey Horner, Ilford, England, assignors to Ilford Limited, Ilford, England, a British company Application November 12, 1941, Serial No. 419,638
In Great Britain November 27, 1940

12 Claims. (Cl. 73—159)

This invention relates to the manufacture of light-sensitive photographic sheet material, e. g. films, plates and papers.

Light-sensitive photographic sheet material as ordinarily manufactured may contain faults of various kinds, e. g. uneven thicknesses of emulsion coating, small bubbles, opaque particles and the like and it is important that before photographic material is marketed, any serious faults should be located and the faulty material cut out. Hitherto, it has been customary to examine films and plates for such faults visually. In order that the material should not be fogged, it is necessary to conduct such visual examination by light to which the material is not appreciably sensitive. Panchromatic materials, however, are sensitive to all regions of the visible spectrum and can be examined visually only at very low levels of illumination, and the examination is therefore very difficult and uncertain. Moreover, it has been discovered that the visual acuity of the eye at the low level of illumination necessary is so small that faults below a certain finite size (which may be quite large) are completely invisible.

According to the present invention, in the manufacture of sheet material carrying a light-sensitive photographic emulsion, the material is passed through a machine which comprises a source of radiation of a wavelength to which the photographic emulsion is substantially insensitive, means for scanning the whole area, or any selected area, of the material, with a narrow beam of such radiation, a photoelectric device sensitive to such radiation and disposed so that the scanning beam of radiation falls upon it after passage through or reflection from the material, means for amplifying electrical impulses generated by such photoelectric device and means for rendering visible or audible and/or for recording such amplified impulses whereby faults in the material causing the electrical impulses are located, and means for cutting from the material parts containing faults thus located.

It is to be understood that in some cases the faults located may be of such a nature that a whole plate or even a whole roll of film or paper is valueless and must be rejected, and the foregoing statement of the invention is to be understood as including this possibility.

According to a further feature of the present invention, a method of manufacturing sheet material carrying a light-sensitive photographic emulsion comprises passing a continuous stream of individual pieces of such material or a substantial continuous web of such material through a machine which comprises a source of radiation of a wavelength to which the photographic emulsion is substantially insensitive, means for scanning successive areas of said stream or of said continuous web with a narrow beam of such radiation, a photoelectric device sensitive to such radiation and disposed so that the scanning beam of radiation falls upon it after passage through or reflection from the material, means for amplifying electrical impulses generated by such photoelectric device and means for rendering visible or audible and/or for recording such amplified impulses, whereby faults in the material causing the electrical impulses are located, said method also including the operation of removing from said stream (e. g. removing individual pieces) or removing from said continuous web (e. g. cutting out selected areas) the parts containing faults thus located.

As indicated above, the radiation employed should be of a wavelength or wavelengths to which the material to be treated is substantially insensitive. A source emitting infra-red radiation used in conjunction with a non-scattering filter transmitting only infra-red radiation is convenient for general use when treating non-colour-sensitive, orthochromatic or panchromatic material. Photographic materials sensitive to infra-red rays are usually insensitive or substantially insensitive to some region in the visible spectrum and in examining such material according to this invention light of wave-lengths within such region may be employed.

Any method of scanning the material may be employed and the methods of light-scanning used in television practice are generally suitable. Thus, the scanning may be effected by means of a Nipkow disc, an aperture drum or endless band, a lensed disc or drum, or a mirror drum, on the usual television principles. Since, however, the manner in which the photographic material is scanned is unimportant provided that fogging of the material does not occur, other means of scanning may be employed whereby greater brightness is obtained by the use of larger effective lens apertures than is possible by television methods. One such method is to employ a mirror attached to the end of a rotating shaft and inclined at a small angle to a plane perpendicular to the axis of the shaft; if a beam of suitable radiation is projected on to such a mirror so that the axis of the beam coincides with the axis of rotation of the mirror, the reflected beam scans in the form of a circle, so that if the diameter of the scanning circle is suitably arranged and the photographic material is moved steadily past the scanning position, the whole area of the material may be scanned.

Another, and particularly convenient, method of scanning is to employ a mirror mounted on an oscillating support. By projecting a narrow beam of radiation on to such a mirror the reflected beam, due to the oscillating motion of the mirror, may be made to traverse to and fro along a narrow line; by allowing the reflected beam to fall on the photographic material and moving the material steadily past the position of the projected beam the whole area may be scanned. It will be appreciated, of course, that with such an arrangement the scanning line should not be parallel to the direction of motion of the photographic material; it may be at right angles, but is preferably at an angle of from 45° to 135° to the direction of the material; faults sometimes occur as lines running at right angles to the length of the photographic material and by scanning at an angle of from 45° to 135° to the length of the material a tendency for such faults to escape detection is avoided.

The above-described methods of scanning using an oscillating mirror or a rotating mirror are much preferred to the method employing a Nipkow disc. Thus, the effective optical aperture using a Nipkow disc is small unless the disc is provided with a lens or mirror system and, moreover, with the Nipkow disc the change over from one hole to the next usually causes a "kick" in the photo-electric response, which it is difficult to suppress.

It is important that the scanning lines should be continuous or that they overlap with one another. This may be effected by adjusting the frequency of the scanning device in relation to the rate of travel of the photographic material and in relation to the dimensions of the beam of radiation falling on the material. It may be arranged that the whole area of the material is scanned or that the scanning stops short of the edges thus avoiding the formation of electrical impulses caused by the edges. In the former case it is possible to devise suppressor circuits to eliminate the electrical impulse caused by the 'edges. These may be operated by subsidiary photo-cells on which the scanning beam falls when it leaves the edge of the material. Alternatively, when the beam passes the edge of the material it may be focussed optically on the main photo-electric device giving rise to extra large impulses which can be separated out to operate the suppressor circuit. In either case, a time lag must be introduced between the suppressor impulse and the main signal. This may be done electrically or optically by the use of twin scanning spots.

Similar circuits may be used if there is any tendency for the photographic material to wander from side to side in the apparatus, but in this case it may be preferable to bias the centre of the scanning beam so that it follows the film, by means of a subsidiary source of radiation and a subsidiary photo-cell operating at the film edge.

Whatever method of scanning is employed, the scanning beam of radiation, after passage through or reflection from, the photographic material, must be directed on to a photoelectric device which is sensitive to such radiation.

In employing the scanning devices referred to above, a periodic variation in the response of the photoelectric device may arise due to variation in the angle of incidence of the scanning beam of light on the photographic material and/or on the photoelectric device. This variation can be reduced by placing the film between two "condenser" lenses so that the mirror and the photoelectric devices are at the foci, but since the variation is periodic and of relatively low frequency, it may be eliminated from the cell-response by means of an electrical filter circuit. Such a filter circuit will also eliminate from the cell-response any variation due to a slow variation in the character of the photographic material, such as a very gradual variation in the thickness of the emulsion which variations in the character of the photographic material are usually not of great importance. In fact filter circuits may be used for discriminating between different types of fault some of which may not be bad from a photographic standpoint but yet might give rise to a signal which would cause the material to be rejected. Thus various faults will give signals of various frequencies and amplitudes according to their size, sharpness of edge, and density. A further means of discrimination is afforded by adjustment of the size of the scanning spot and its sharpness or diffuseness.

The electrical impulses derived from the photoelectric device are amplified by any suitable form of valve amplifier or multiplier tube and the presence of any faults in the photographic material is thus indicated by a change in the electrical response derived from the amplifier. This response may be used in various ways. Thus, for example, it may be caused to produce an image on the fluorescent screen of a cathode ray oscillograph tube using the general principles of television reception, or it may be caused to operate a pen to make a permanent record on a moving band or tape, or it may be caused to operate a mechanical device for stopping the machine wherever a fault of sufficient magnitude occurs. Again, the response may be made to operate mechanism for marking the photographic material at any point where a serious fault occurs. The foregoing are only a few of the possible applications of the response derived from the amplifier and it will be appreciated that by making use of well-known electrical principles the response may be made to operate various kinds of mechanical recording or rejective apparatus.

A few isolated minor faults in a plate or length of film or paper may not be of any great importance and the response of the apparatus may therefore be so adjusted that the operative's attention is not drawn to such minor faults individually. However, a large number of such minor faults occurring in a small area of a plate, film or paper may as a whole constitute a major fault sufficient to warrant rejection of that particular area of the plate or that particular length of film or paper and accordingly it is desirable to arrange the apparatus so that an excessive number of minor faults occurring in any small area are registered. One convenient method is to arrange that the impulses derived from such minor faults have the effect of charging a condenser which leaks at a constant rate; by adjusting the rate of leakage from the condenser in relation to the rate of travel of the photographic material it may be easily arranged that an excessive number of minor faults occurring in a limited time will charge the condenser above some predetermined limit and thus operate a recording or rejecting apparatus.

The cutting-out of the faulty portions from a continuous length of film may be effected after the whole length of film has passed through the apparatus described above providing a record is made or the material is marked so that the position of the faulty portions may be subsequently located. Alternatively, as already indicated, the arrangement may be such that on registering a major fault requiring a cutting operation, the amplified cell-response operates mechanism bringing the photographic material to a standstill so that the faulty portion may be cut out immediately.

The invention is diagrammatically illustrated in the accompanying drawings in which:

Fig. 1 illustrates a suitable arrangement for scanning film using a modified form of Nipkow disc.

Fig. 2 is a face view of the Nipkow disc used in the arrangement illustrated in Fig. 1.

Fig. 3 illustrates an alternative arrangement for scanning film using an inclined rotating mirror.

Fig. 4 illustrates in side elevation a convenient form of the apparatus using a vibrating mirror for the scanning.

Fig. 5 is a plan view of the apparatus of Fig. 4.

Fig. 6 illustrates a detail of a modified form of the apparatus of Figs. 4 and 5.

Fig. 7 illustrates a further detail of a modified form of the apparatus of Figs. 4 and 5.

Fig. 8 illustrates further details of a modified form of the apparatus of Figs. 4 and 5.

Fig. 9 illustrates in plan certain of the details of Fig. 8.

Fig. 10 illustrates another modification of the apparatus of Figs. 4 and 5.

Referring to Figure 1, a source of light 1 is arranged to pass light through an infra-red filter 2 and a condenser lens 3. Parallel light emerging from the condenser lens 3 passes through small holes in a modified Nipkow disc 4 and thence through the film 5 (which is arranged to travel horizontally across the illuminated field) and a further condensing lens 6 to a photo-electric cell 7. The arrangement is such that the source of light 1 is located at the focus of the condenser lens 3 and so that the photo-electric cell 7 is located at the focus of the condenser lens 6. A pair of shutters 8 are disposed to cover the edges of the film so that as the disc is rotated the light from one hole is cut off by one of the shutters at the same time as the light from the next hole passes the other shutter and falls on the film. The provision of the second condenser lens ensures that the normal component of the scattered light from the spot on the film falls on the photocell throughout the passage of the spot over the film. Without this a considerable variation in the intensity of the light falling on the cell takes place as the spot traverses the film, owing to the changing angle of scatter.

Figure 2 illustrates in face view the modified Nipkow disc used in the arrangement illustrated in Figure 1. The disc consists of a thin sheet of metal provided with six small holes 9 disposed symmetrically.

Figure 3 illustrates an alternative arrangement wherein the scanning is effected by means of a rotating mirror. Light from a source 1 passes through a condenser lens 3, an aperture 15, a projector lens 10, an infra-red filter 2 and falls on a prism 11 mounted for convenience on a glass plate 12. The light is reflected from the rear face of the prism on to a flat mirror 13 which is mounted at an angle to the normal on the shaft of a motor 14. As the motor rotates the spot of light reflected from the mirror 13 describes a circular path on the film 5 and, passing through the film, falls on the photocell 7.

This arrangement presents an advantage over that illustrated in Figs. 1 and 2 inasmuch as the spot of light does not leave the film and the photocell response therefore does not show a "kick" at the edges of the film. The condenser lens 6 used in the arrangement of Figure 1 is not necessary since the angle of scatter remains sensibly constant.

Figure 4 illustrates in side elevation an arrangement using a vibrating mirror for the scanning. Figure 5 shows in plan certain details of this apparatus. Referring to these figures, light is provided by a source 1 and passes through an aperture 15, a condenser lens 3, a focussing tube 16, a projector lens 10 and falls on a mirror 17.

The condenser lens 3 is close up to the source of light 1 and throws an image of the source of light on to the projector lens 10. The projector lens throws an image of the condenser lens aperture 15 on to the mirror 17. It will be seen therefore that the size and shape of the condenser lens aperture 15 determines the size and shape of the spot of light thrown on the film.

The mirror 17 is backed by a metal plate and supported on a bifilar suspension of two piano wires 18. The wires are anchored at one end and pass over two steel bridges 19 and 20. A screw 21 is provided at the other end to adjust the tension of the wires. A soft iron rod 22 projects normally from the metal plate behind the mirror. The end of the rod is located between the poles of a permanent magnet 23 and the middle of the rod passes through a coil of fine wire 24.

The magnet 23 and coil 24 are fixed and are so disposed that there is sufficient clearance inside the coil and between the poles of the magnet for the rod 22 to swing through a considerable angle about the bifilar suspension. On passing an alternating current through the coil the rod-mirror system vibrates with the frequency of the current. The coil is fed through a stabilizing transformer from any source of alternating current, e. g. the main alternating current of frequency 50 cycles per second commonly used for lighting supply.

The mean position of the rod-mirror system may be controlled by superimposing a direct current on the alternating current passing through the coil 24, the variation in the voltage supplied varying the position of the rod 22. This electrical method of controlling the mean position is convenient but it will be appreciated that the desired result may also be obtained by suitably tilting the whole rod-mirror system.

Preferably the rate of travel of the film relative to the scanning frequency is such that the successive bands scanned by the spot on the film in each direction just touch each other. Every point on the film is therefore scanned at least twice, once in the upward direction and once in the downward direction. This arrangement presents the important advantage that a small fault on the film which might be situated at the common edge of two successive bands scanned in one direction will lie in the middle of the intervening band scanned in the other direction (except near the edges where faults are of less importance) and will thus not escape detection.

The rod-mirror system may be tuned mechanically by varying the tension of the wires. At resonance point the amplitude of the rod-mirror system is very sensitive to small changes in the tension of the wires, which may occur due to fluctuations in temperature or fatigue. Preferably, therefore, the tension of the wires is adjusted to a point on the flat region of the amplitude/tension curve. In this condition the amplitude is mainly dependant on the voltage applied across the coil; the wires then play little part in controlling the oscillations and merely serve to support the system in the required position.

In operation the amplitude of the oscillation of the rod-mirror system is adjusted by means of a variable resistance in series with the coil, the resistance being adjusted so that the film is scanned to within about ⅛" of each edge of the film.

Between the mirror 17 and the infra-red filter 2 there may be provided a glass plate 25 disposed so as to reflect a portion of the light from the scanning beam. The light so reflected may be allowed to fall on a ground glass screen and thus provide means for visually checking the position of the scanning beam during the operation of the apparatus. Alternatively, such reflected light may be used to operate a photo-electric device for maintaining the amplitude constant. It will be appreciated, however, that the glass plate 25 and associated devices are not an essential part of the apparatus.

The scanning beam, after passing through the film, falls on a photo-electric cell 26 associated with an electron multiplier 27. The combined photo-electric cell and electron multiplier is fed by a high voltage rectifier 28. The output is fed to an amplifier 29 associated with a low voltage rectifier 30. The amplifier 29 includes a high-pass filter which prevents frequencies below any predetermined value from passing; this permits the source of light 1 to be a lamp fed by alternating current (50 cycles per second) and also avoids difficulties otherwise encountered in the collection of the scattered light from the film. The output of the amplifier is passed to a trigger circuit 31 associated with a low voltage rectifier 32. The trigger circuit 31 comprises a thyratron or a combination of thermionic valves and is so designed that only impulses greater than a predetermined value (which can be adjusted as desired having regard to the minimum size or minimum variation from mean opacity of the faults on the film which it is desired to observe) operate the trigger circuit. The thyratron or combination of thermionic valves operates a relay which in turn may be made to operate any desired recording device. As illustrated, the trigger circuit 31 may operate any or all of a counter 33, a recorder 34 or a device 35 for punching the film when an important fault occurs.

In Figure 5 the film winding apparatus is shown. It consists of a feed roller 36, roller guides 37, a driven roller 38 and an overdrive take-up roller 39.

As stated above, it is highly desirable that the apparatus should be so constructed that the scanning beam does not pass beyond the edges of the film passing through the apparatus since if it does, the photocell response registers a "kick" as the beam passes over the edge of the film. By proper adjustment of the apparatus described above, this difficulty can be largely avoided. However, there is frequently a tendency for the film to wander from side to side in the apparatus and in this connection it is desirable to include a device to control the position of the scanning beam or to suppress its response as it passes over the edge of the film.

The apparatus illustrated in Figures 4 and 5 described above may readily be modified to include such devices. Figures 6, 7, 8 and 9 illustrate certain details of such modified apparatus. Referring to Figure 6, the main source of light 1 casts a beam of light through a condenser lens 3 and other equipment exactly as in Figures 4 and 5. Near to the source of light 1 is provided a prism 36, which reflects an auxiliary beam of light through a condenser lens 37 and an analogous optical system. Both beams of light are arranged to fall on the vibrating mirror 17 but the arrangement is such that the auxiliary beam of light is split to form two beams 38 and 39 which fall on the film at a position a short distance away from the main scanning beam 40 and so that one of the two auxiliary beams is slightly above the level of the main scanning beam and the other slightly below the level of the main scanning beam. The relative positions of the spots on the film are illustrated in Figure 7.

It will be appreciated that with this arrangement one of the auxiliary beams always passes over the edge of the film before the main scanning beam does so. Such auxiliary beams may be used to operate a suppressor circuit and an arrangement of this character is illustrated in Figures 8 and 9. Referring to Figures 8 and 9, the auxiliary beams 38 and 39, when they clear the edge of the film 5, pass through lenses 41 and fall on mirrors 42 and 43 which reflect the beams, as shown, on to an auxiliary photocell 44. The response from this photocell is connected to an amplifier 45 and suppressor circuit 46 which are connected to the trigger circuit 31. The remainder of the electrical equipment associated with the photocell 26 and electron multiplier 27 remains as illustrated in Figure 4 and described above. By means of this arrangement the main circuit derived from the photocell 26 is only in operation while the main scanning beam is travelling across the film 5 and is suppressed at a point when the main scanning beam is just short of the edge of the film. The distance from the edge of the film at which the suppressor circuit comes into operation will depend on the relative positions of the beams 38 and 39 and may be adjusted as desired.

An alternative method of dealing with the problem of the film wandering from side to side is diagrammatically illustrated in Figure 10. It will be appreciated that when the apparatus described above is adjusted so that the auxiliary beams just overshoot the edges of the film, an increase in scanning amplitude will increase the amount of such overshoot to the same extent at each edge while an alteration in the position of the film will cause an increase in the amount of overshoot at one edge and a corresponding decrease in the amount of overshoot at the other edge.

The method illustrated in Figure 10 makes use of these facts. It consists in utilizing twin auxiliary beams 38 and 39 as in Figure 8 but causing these beams passing through lenses 41 to fall directly on twin auxiliary photocells 47 and 48, one behind each lens. The two cells are connected together and their outputs are fed through a system of resistances A, B and C to an electrical control device 49 which itself gives an output which is proportional to the difference between the outputs of the two photocells 47 and 49. The output from the device 49 is fed to a D. C. amplifier 50 which is connected to a source of direct current supply, the direct current output of the amplifier 50 being dependent on the voltage fed to it by the device 49.

The outputs of the photocells 47 and 48 are also fed as shown to an electrical control device 51 which gives an output proportional to the sum of the outputs of the photocells. The output from the device 51 is fed to an A. C. amplifier 52 which is connected to a source of alternating current supply, the alternating current output of the amplifier 52 being dependent on the voltage fed to it by the device 51.

The outputs of the devices 50 and 52 are applied to the coil 24 (shown in Figure 4), a filter 53 being provided to prevent interaction between the direct current and alternating current circuits. The main scanning beam 40 falls on a photocell 26 (as in Figures 8 and 9) with its associated circuit.

It will readily be seen that change in scanning amplitude will affect only the devices 51 and 52 because the outputs of both photocells will alter by the same amount and their difference will be zero. The electrical arrangements in the devices 51 and 52 are such that an increase in response derived from the photocells 47 and 48 (due to increased scanning amplitude) will cause a decrease in the power supplied to the coil 24, thus causing a decrease in the scanning amplitude.

Furthermore, a change in the position of the film will affect only the devices 49 and 50 since the sum of the responses of the photocells will remain unchanged. The electrical arrangements are such that the effect of a change in the position of the film causes a change in the difference between the outputs of the photocells, one way or the other, and so causes the direct current supply to the coil 24 to be increased or decreased as the case may be. This has the effect of deflecting the position of the mirror-rod system until the output of the photocells becomes equal again. The whole system acts as a "governor" holding the amplitude and direction of the main scanning beam at such a value and position that the auxiliary beams just pass over the edges of the film. The main scanning beam therefore scans the width of the film to within a predetermined distance of the edges, never passing over the edges and always following the film as it moves from side to side. In this arrangement there is no need for any suppressor circuit. The action of this "governor" system is independent of the steadiness or characteristics of the amplifiers used provided the amplification is sufficiently high.

What we claim is:

1. Apparatus for detecting faults in sheet material carrying a light-sensitive photographic emulsion which comprises a source of radiation of a wavelength to which the photographic emulsion is substantially insensitive, means for continuously scanning any area of the material with a moving narrow beam of such radiation, a photo-electric device sensitive to such radiation and disposed so that the fraction of the scanning beam of radiation which is unabsorbed by the material falls upon said photo-electric device, means for amplifying electrical impulses generated by such photo-electric device and means for observing such amplified impulses whereby faults in the material causing the electrical impulses are located.

2. Apparatus according to claim 1 wherein the source of radiation is a source of infra-red rays.

3. Apparatus for detecting faults in sheet material carrying a light sensitive photographic emulsion which comprises a source of radiation of a wavelength to which the photographic emulsion is substantially insensitive, optical means for projecting a narrow beam of such radiation, a support, a mirror mounted on said support and disposed so that the said narrow beam of radiation falls upon it, means for rapidly oscillating said support whereby the beam of radiation reflected by the said mirror is caused to oscillate, means for traversing said sheet material in such a position and at such a rate that the beam of radiation reflected from said mirror scans substantially the whole of the said sheet material, a photo-electric device so disposed as to pick up the scattered radiation which is unabsorbed by said sheet material, means for amplifying electrical impulses generated by such photo-electric device, and means for observing such amplified impulses.

4. Apparatus for detecting faults in sheet material carrying a light-sensitive photographic emulsion which comprises a source of radiation of a wavelength to which the photographic emulsion is substantially insensitive, optical means for projecting a narrow beam of such radiation, a mirror mounted on a support and disposed so that the said narrow beam of radiation falls upon it, a soft iron rod attached normally to the rear of said mirror, the said rod and mirror being mounted on a bifilar suspension permitting them to oscillate, a permanent magnet located with its poles across the end of said rod, a coil of wire wound round the said rod, the said magnet poles and the said coil being disposed so as to allow sufficient clearance for the rod to oscillate between them, means for passing an alternating current through the said coil whereby the said rod is caused to oscillate in sympathy with the frequency of the said alternating current and the beam of radiation reflected by the mirror is thereby caused to oscillate, means for passing a direct current through the said coil whereby the mean position of oscillation of the rod may be controlled, means for traversing said sheet material in such a position and at such a rate that the beam of radiation reflected from said mirror scans substantially the whole of the said sheet material, a photo-electric device so disposed as to pick up the scattered radiation which is unabsorbed by said sheet material, means for amplifying electrical impulses generated by such photo-electric device, and means for observing such amplified impulses.

5. Apparatus for detecting faults in sheet material carrying a light-sensitive photographic emulsion which comprises a source of radiation of a wavelength to which the photographic emulsion is substantially insensitive, optical means for projecting a narrow beam of such radiation, a mirror mounted on a support and disposed so that the said narrow beam of radiation falls upon it, a soft iron rod attached normally to the rear of said mirror, the said rod and mirror being mounted on a bifilar suspension permitting them to oscillate, a permanent magnet located with its poles across the end of said rod, a coil of wire wound round the said rod, the said magnet poles and the said coil being disposed so as to allow sufficient clearance for the rod to oscillate between them, means for passing an alternating current through the said coil whereby the said rod is caused to oscillate in sympathy with the frequency of the said alternating current and the beam of radiation reflected by the mirror is thereby caused to oscillate, means for passing a direct current through the said coil whereby the mean position of the oscillation of the rod may be controlled, means for traversing said sheet material in such a position and at such a rate that the beam of radiation reflected from said mirror scans substantially the whole of the said sheet material, a photo-electric device so disposed as to pick up the scattered radiation reflected from or transmitted by said sheet material, means for amplifying the electrical response of such photo-electric device, means operated by said amplified response, including a trigger circuit and a filter for removing unwanted low frequencies from the response, adapted to operate a device for marking the sheet material whenever the amplitude or frequency of the response exceeds a predetermined value.

6. Apparatus according to claim 5 which includes means for projecting on to the said mirror twin auxiliary beams of the said radiation in such a position that the said twin auxiliary beams scan the sheet material at a position spaced a short distance apart from the main scanning beam, one of said auxiliary beams being disposed a short distance in advance of the main scanning beam and the other said auxiliary beams being disposed a short distance behind the main scanning beam, whereby during scanning one or other of the said auxiliary beams reaches the edge of the sheet material before the main scanning beam reaches the said edge, and twin auxiliary photo-electric devices disposed to pick up said auxiliary beams as they pass beyond the edges of the sheet material and electrically arranged so that the response from said photo-electric devices controls the current supply, both alternating and direct, to the said coil and hence controls the amplitude and mean oscillation position of the said rod.

7. Apparatus according to claim 5 which includes means for projecting on to the said mirror twin auxiliary beams of the said radiation in such a position that the said twin auxiliary beams scan the sheet material at a position spaced a short distance apart from the main scanning beam, one of said auxiliary beams being disposed a short distance in advance of the main scanning beam and the other said auxiliary beam being disposed a short distance behind the main scanning beam, whereby during scanning one or other of the said auxiliary beams reaches the edges of the sheet material before the main scanning beam reaches the said edge, and means for projecting said auxiliary beams on to an auxiliary photoelectric device electrically arranged so as to operate a suppressor circuit whereby the response from the main scanning beam is cut out whenever either of the said auxiliary beams passes over the edge of the sheet material.

8. Apparatus according to claim 1 wherein the photo-electric device incorporates an electron multiplier.

9. Apparatus according to claim 1 wherein the scanning is so arranged that each scanning band in one direction is contiguous with the next successive scanning band in the same direction, the alternate scanning beams in the reverse direction over-lapping therewith, whereby each point on the sheet material is scanned twice.

10. A process for testing sheet material carrying a light sensitive photographic emulsion which comprises traversing the said material continuously past a testing position, continuously scanning an area of the material as it passes said position with a moving narrow beam of radiation to which the emulsion is substantially insensitive, converting the fraction of the scanning beam of radiation which is not absorbed by the material to a photoelectric current, amplifying variations in the said current and observing said amplified variations, thereby locating faults in the said material causing said variations.

11. A process for testing sheet material carrying a light sensitive panchromatic photographic emulsion which comprises traversing the said material continuously past a testing position, continuously scanning an area of the material as it passes said position with a moving narrow beam of infrared radiation to which the emulsion is substantially insensitive, converting the fraction of the scanning beam of infrared radiation which is not absorbed by the material to a photoelectric current, amplifying variations in the said current and observing said amplified variations, thereby locating faults in the said material causing said variations.

12. Apparatus for detecting faults in sheet material carrying a light-sensitive photographic emulsion which comprises a source of radiation of a wavelength to which the photographic emulsion is substantially insensitive, means for continuously scanning any area of the material with a moving narrow beam of such radiation, a photoelectric device sensitive to such radiation and disposed so that the fraction of the scanning beam of radiation which is unabsorbed by the materials falls upon said photoelectric device, means for amplifying the alternating current component of the electrical impulses generated by such photoelectrical device including an amplifier provided with a high-pass filter and means for observing such amplified impulses whereby faults in the material causing the electrical impulses are located.

GEOFFREY BOND HARRISON.
ROBERT JAMES HERCOCK.
REGINALD GEOFFREY HORNER.